United States Patent [19]

Gössmann

[11] Patent Number: 4,676,671
[45] Date of Patent: Jun. 30, 1987

[54] SEALS FOR BEARING WITH CIRCULATING OUTER RING

[75] Inventor: Reimund Gössmann, Schweinfurt, Fed. Rep. of Germany

[73] Assignee: SKF GmbH, Schweinfurt, Fed. Rep. of Germany

[21] Appl. No.: 889,982

[22] Filed: Jul. 24, 1986

[30] Foreign Application Priority Data

Jul. 27, 1985 [DE] Fed. Rep. of Germany ... 8521744[U]

[51] Int. Cl.[4] .......................................... F16C 33/78
[52] U.S. Cl. ................................. 384/485; 384/480; 384/488
[58] Field of Search ............... 384/485, 480, 488, 147, 384/144; 277/57; 212 F

[56] References Cited

U.S. PATENT DOCUMENTS

| 3,602,559 | 8/1971 | Hirschler | 277/57 |
| 3,792,912 | 2/1974 | Howe, Jr. et al. | 308/187.2 |
| 3,858,950 | 1/1975 | Otto | 384/485 |
| 4,093,324 | 6/1978 | Carrigan | 277/57 |
| 4,277,114 | 7/1981 | Lindegger | 384/480 |
| 4,377,312 | 3/1983 | Zackrisson | 384/484 |

*Primary Examiner*—Lenard A. Footland
*Attorney, Agent, or Firm*—Rosen, Dainow & Jacobs

[57] ABSTRACT

A rolling bearing has an outer ring and an inner ring and rolling elements positioned between the inner and outer rings. A seal at each end of the bearing includes a sheet metal portion extending radially from and affixed to the inner ring, and an elastic seal portion sliding on the bore of the outer ring. A plurality of axially inwardly extending projections on the sheet metal portion have different lengths, with their lengths increasing with increasing diameters thereof.

2 Claims, 1 Drawing Figure

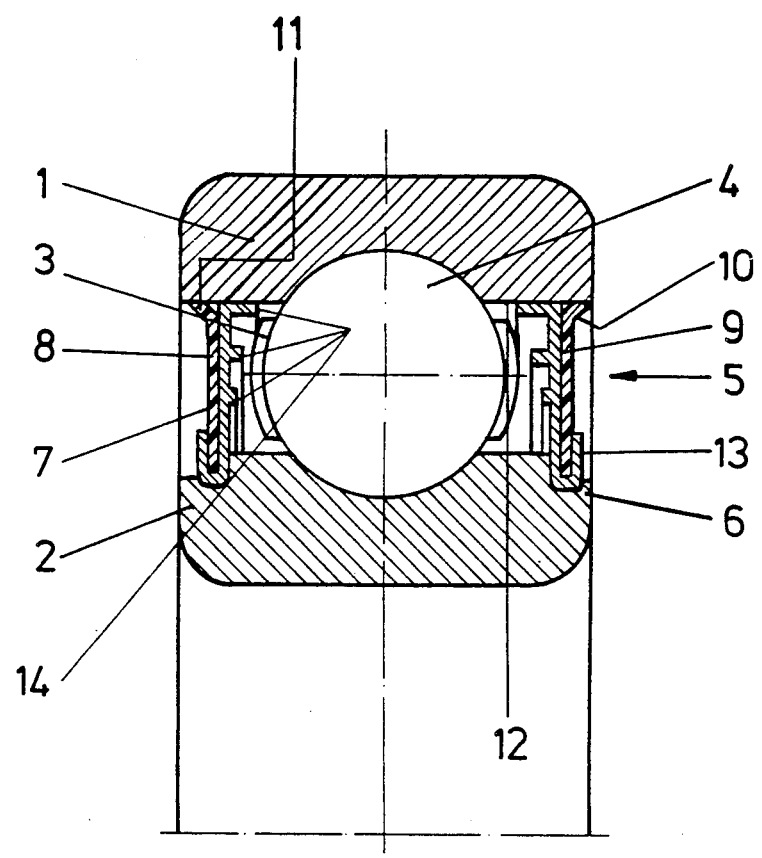

SEALS FOR BEARING WITH CIRCULATING OUTER RING

This invention relates to a seal for a bearing having a rotatable outer ring, especially adaptable for the rolling bearing of wide pressing rollers for paper, textile and plastic webs, wherein the seals are formed of a sheet metal part affixed to the bearing inner ring and a sealing portion of a elastic material, for example of plastic, and wherein the sealing portion has a sealing lip close to or engaging the outer bearing ring.

A seal of this type is disclosed, for example, in U.S. Pat. No. 3,792,912. The seal of this known arrangement has the disadvantage that the lubricating grease therein can be thrown out of the bearing when the bearing rotates at high rotational speeds, so that the bearing must be relubricated at regular intervals.

The present invention is therefore directed to the provision of a bearing of the above type, having a sliding type seal for a bearing with an outer ring, in which the lubricant remains in the bearing space and its loss is inhibited.

Briefly stated, in accordance with the invention, this object is solved by the provision of a bearing of the above type wherein the sheet metal part of the seal is provided with at least two axially extending annular projections on the side thereof toward the bearing inner space, the radially outermost of the projections preferably extending at a location adjacent the bearing outer ring. The projections have different axial lengths, with their axial lengths increasing with increasing diameters thereof. As a result of the provision of a sheet metal part of this configuration, the grease remains in the bearing even at high rotational speeds thereof, so that the lubrication function is retained throughout the useful life of the bearing and damage due to loss of the lubricant is prevented.

In order that the invention may be more clearly understood it will now be disclosed in greater detail with reference to the accompanying drawing, which is a cross sectional view of a bearing in accordance with the invention, on one side the central axis thereof.

Referring now to the drawing, the illustrated bearing is a grooved ball bearing (i.e. having races formed directly in the bearing rings) comprised of an outer ring 1, an inner ring 2 and balls 4 arranged in a cage 3. This type of bearing may typically be employed, for example only, for the support of wide drawing rollers which are supported on an axle by the rolling bearing to rotate with the outer ring 1 thereof.

The inner space of the bearing is closed on both sides by a seal 5 which is held in each case by an annular groove 6 in the respective end of the inner ring 2. Each seal 5 has a generally radially extending sheet metal part 7 and a seal portion 8 of elastically yielding material, for example plastic material vulcanized on the axially outer side 9 of the sheet metal part 7. The seal portions 8 extend radially outwardly and lightly engage the cylindrical bore surface 12 of the outer ring 1. The sheet metal parts 7 bend around the inner edge of the respective seal portions 8, to produce a widened holding section 13 which is snapped in the respective annular grove 6. The sheet metal part 7 is provided with, for example only, three axially inwardly extending annular projections 14 on the side thereof toward the balls 4. The projections 14 have different lengths, with their axial lengths increasing as their diameters increase. The radially the outer projection 14 may be formed by axially inwardly bending the edge of the sheet metal part 7 so that this projection is located adjacent and spaced from the bore surface of the outer ring 12 with play. The remaining projections 14 can be produced for examle by the pressure of a rotating bead. As a result of this formation of the sheet metal part 7 the grease remains in the inner space of the bearing and the escape of the lubricant is inhibited, even at high rotational speeds of the bearing. The sealing lips 10,11 of the seal portions 8, which lay against the cylindrical bore surface of the outer ring 1 with light pressure, are axially outwardly angled at their radially outer edges as illustrated, so that dirt, water and the like can not enter the bearing by force.

While the invention has been disclosed and described with reference to a single embodiment, it will be apparent that many variations and modifications may be made therein within the scope of the invention. Thus, changes may be made in the construction of the individual components, and the seals may be alternatively employed in roller bearings. It is therefore intended in the following claims to cover each such variation and modification of the invention.

What is claimed is:

1. In a bearing having an inner ring, a rotatable outer ring, rolling elements between said inner and outer rings, and a seal comprised of a sheet metal portion held to the inner ring and a seal portion of an elastic material having an sealing lip engaging the outer ring, the improvement wherein the sheet metal portion has at least two radially spaced substantially axially inwardly directed annular projections with different lengths on the side thereof toward said rolling elements, the projections having different diameters with the radially outermost projection being radially spaced from said outer ring, the axial lengths of said projections increasing with increasing diameters thereof.

2. The seal of claim 1 wherein the radially outermost of said projections is formed at the radially outer end of said sheet metal portion, said radially outermost projection being spaced from the bore surface of the outer ring with minimum play.

* * * * *